Patented Aug. 6, 1946

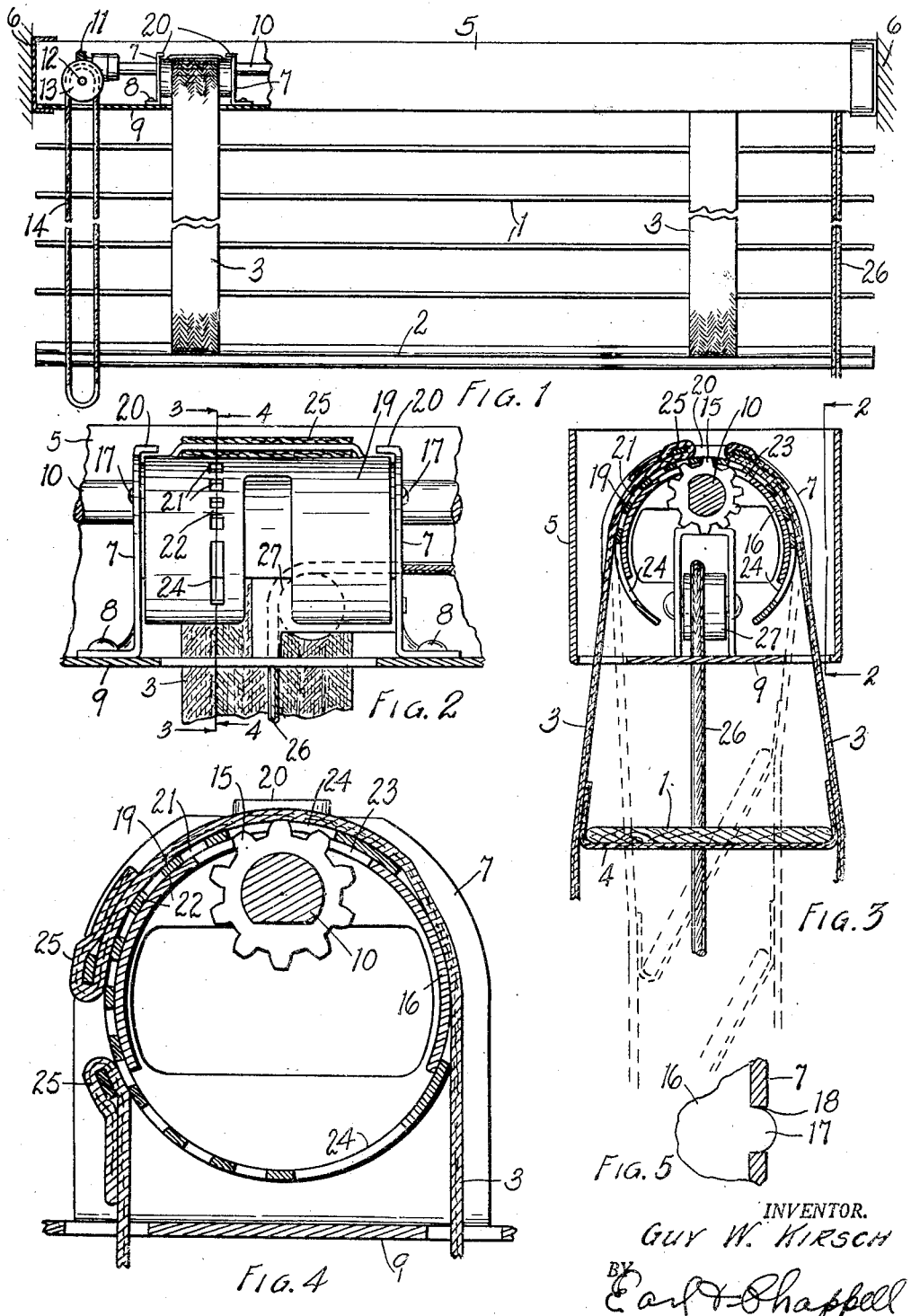

2,405,153

UNITED STATES PATENT OFFICE 2,405,153

VENETIAN BLIND ADJUSTING MEANS

Guy W. Kirsch, Sturgis, Mich., assignor to Kirsch Company, St. Joseph, Mich., a corporation of Michigan Application July 20, 1945, Serial No. 606,055

8 Claims. (Cl. 160—176)

This invention relates to improvements in Venetian blind adjusting means.

The main objects of this invention are:

First, to provide an adjusting mechanism for the suspending tapes of Venetian blinds which permits of their being adjusted throughout their full range of adjustment and the equalizing thereof as occasion may require.

Second, to provide an adjusting mechanism for Venetian blinds which is highly efficient, permits ready attachment of the tapes thereto, and one which may be economically produced and assembled.

Objects relating to details and economies of the invention will appear from the description to follow. The invention is defined and pointed out in the claims.

A preferred embodiment of the invention is illustrated in the accompanying drawing, in which:

Fig. 1 is a fragmentary elevation of a Venetian blind structure embodying the features of my invention, parts being shown in conventional form.

Fig. 2 is an enlarged fragmentary view partially in section on line 2—2 of Fig. 3, parts being broken away to disclose details.

Fig. 3 is a fragmentary transverse section on line 3—3 of Fig. 2.

Fig. 4 is an enlarged fragmentary transverse section corresponding to that of Fig. 3 showing the parts in one position of adjustment substantially as shown by dotted lines therein.

Fig. 5 is an enlarged detail fragmentary view showing the manner of mounting the rack supporting bearing member upon the supporting brackets.

In the accompanying drawing, 1 represents the slats, 2 the bottom bar, and 3, 3 the suspending tapes arranged in pairs and provided with suitable slat supports 4 extending between the tapes, these parts being conventional.

The header 5 is illustrated as of channel section and is mounted on the casing conventionally illustrated at 6. Within the housing I mount pairs of supporting brackets 7 preferably formed as sheet metal stampings and secured at 8 to the bottom of the housing 9.

The actuating shaft 10 is arranged longitudinally of the housing through these brackets, being preferably rotatably supported thereby. The shaft is provided at one end with a worm gear and pinion 11 meshing with a worm not illustrated on the shaft 12 of the pulley 13. The slat adjusting cords 14 are associated with this pulley.

The shaft 10 is provided with a pinion 15 rotatable with the shaft, the pinion being arranged between the brackets.

A cylindrically curved rack bearing member 16 preferably formed as a sheet metal stamping is mounted between the brackets and is provided with tongues 17 projecting through holes in the brackets—see Fig. 5.

The cylindrically curved or barrel-like rack member 19 is rotatably mounted on the bearing member between the brackets, the brackets having tongues 20 at their upper ends overhanging the rack member for retaining it. The rack member has a series of holes 21 therein providing teeth 22 coacting with the teeth of the pinion, the bearing member having a transverse slot 23 through which the teeth of the pinion project into engagement with the teeth of the rack, as shown in Figs. 3 and 4. The number of teeth preferably correspond to the number of teeth on the pinion.

At each end of the rack teeth, the rack member is provided with slots 24 of such length as to permit the rotation of the pinion in one direction without imparting rotative movement to the rack.

In the embodiment illustrated, the rack member has strap or bar-like portions 25 struck out therefrom to receive the end of the tapes, as shown in Figs. 3 and 4.

With this arrangement of parts, the shaft may be manipulated to tilt the blinds through their suspending tapes and in the event of mis-adjustment the tapes can be readjusted by rotating the rack to one end or the other by actuating the shaft to bring either one of the slots into register with the pinion and thereby readjust the tapes.

Pull cords 26 are suitably connected to the bottom bar and are tightened with pulleys 27 mounted within the housing. This arrangement is conventional.

I have illustrated and described my invention in a highly practical embodiment thereof both from the standpoint of economy of manufacture and practicability. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. The combination in a Venetian blind including slat adjusting tapes and an adjusting mechanism housing, of an actuating shaft disposed longitudinally of the housing, spaced supporting brackets through which said shaft extends and constituting supports therefor, a pinion on said shaft disposed between said brackets, a cylindrically curved bearing member having tongues on its ends supportedly engaging said brackets, said bearing member having a transverse slot therein through which the teeth of the pinion project, and a cylindrically curved elongated rack member rotatably mounted on said bearing member between said brackets and having a series of holes providing teeth corresponding in spacing to the teeth of the pinion to coact therewith, there being a slot at each end of the rack teeth to provide for rotation of the pinion in one direction without imparting rotative movement to the rack member when either of said slots is in registry with said pinion, said rack member having longitudinal bars struck outwardly therefrom and constituting means for securing the ends of the tapes to said rack member.

2. The combination in a Venetian blind including slat adjusting tapes and an adjusting mechanism housing, of an actuating shaft disposed longitudinally of the housing, spaced supporting brackets through which said shaft extends and constituting supports therefor, a pinion on said shaft disposed between said brackets, a cylindrically curved bearing member mounted on said brackets, said bearing member having a transverse slot therein through which the teeth of the pinion project, and a cylindrically curved elongated rack member rotatably mounted on said bearing member between said brackets and having a series of holes providing teeth coacting with the pinion, there being a slot at each end of the rack teeth to provide for rotation of the pinion in one direction without imparting rotative movement to the rack member when either of said slots is in registry with said pinion.

3. The combination in a Venetian blind including slat adjusting tapes, of an adjusting shaft provided with a pinion, supporting means for said shaft, a cylindrically curved bearing member mounted on said supporting means to surround the pinion and having a transverse slot through which the teeth of the pinion project, and a cylindrically curved elongated rack rotatably mounted on said bearing member and provided with a series of teeth coacting with the pinion, there being a slot at each end of the rack teeth to provide for free rotation of the pinion in one direction at each end of the rack without imparting movement to the rack when either of said slots is in registry with said pinion, said rack member being formed of sheet metal and having tape attaching members integral therewith.

4. The combination in a Venetian blind including slat adjusting tapes, of an adjusting shaft provided with a pinion, supporting means for said shaft, a cylindrically curved bearing member mounted on said supporting means to surround the pinion and having a transverse slot through which the teeth of the pinion project, and a cylindrically curved elongated rack rotatably mounted on said bearing member and provided with a series of teeth coacting with the pinion, there being a slot at each end of the rack teeth to provide for free rotation of the pinion in one direction at each end of the rack without imparting movement to the rack when either of said slots is in registry with said pinion.

5. The combination in a Venetian blind including slat adjusting tapes, of an adjusting shaft provided with a pinion, a bearing, and a tubular rack member rotatably mounted on said bearing and having a series of holes providing teeth coacting with the pinion, there being a slot at each end of the rack teeth to provide for rotion of the pinion in one direction at each end of the rack without actuation of the parts when either of said slots is in registry with said pinion.

6. The combination in a Venetian blind including slat adjusting tapes, of an actuating shaft, spaced supporting brackets, a pinion on said shaft disposed between said brackets, a bearing member carried by said brackets, and a curved rack member rotatably mounted on said bearing member between said brackets and having teeth corresponding in spacing to the teeth of the pinion to coact therewith, there being an opening at each end of the rack teeth to provide for rotation of the pinion in one direction without imparting rotative movement to the rack member when either of said openings is in registry with said pinion, said rack member having longitudinal bars struck outwardly therefrom and constituting means for securing the ends of the tapes to said rack member.

7. The combination in a Venetian blind including slat adjusting tapes, of an actuating shaft, spaced supporting brackets, a pinion on said shaft disposed between said brackets, a bearing member carried by said brackets, and a curved rack member rotatably mounted on said bearing member between said brackets and having teeth corresponding in number to the teeth of the pinion to coact therewith, there being an opening at each end of the rack teeth to provide for rotation of the pinion in one direction without imparting rotative movement to the rack member when either of said openings is in registry with said pinion.

8. The combination in a Venetian blind including slat adjusting tapes, of an actuating shaft, a pinion on said shaft, a bearing member, and a curved rack rotatably mounted on said bearing member to coact with said pinion, there being an opening at each end of the rack teeth to provide for rotation of the pinion in one direction without imparting rotative movement to the rack member when either of said openings is in registry with said pinion.

GUY W. KIRSCH.